(12) United States Patent
Cook

(10) Patent No.: US 11,224,165 B2
(45) Date of Patent: Jan. 18, 2022

(54) AGRICULTURAL HEADER WITH ONE OR MORE MOVABLE WING SECTIONS

(71) Applicant: CNH Industrial America LLC, New Holland, PA (US)

(72) Inventor: Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/534,241

(22) Filed: Aug. 7, 2019

(65) Prior Publication Data

US 2019/0357439 A1    Nov. 28, 2019

Related U.S. Application Data

(63) Continuation of application No. 15/681,732, filed on Aug. 21, 2017, now Pat. No. 10,433,483.

(51) Int. Cl.
*A01D 45/02* (2006.01)
*A01D 41/127* (2006.01)
*A01D 41/06* (2006.01)
*A01B 73/06* (2006.01)
(Continued)

(52) U.S. Cl.
CPC ............ *A01D 45/021* (2013.01); *A01B 73/06* (2013.01); *A01D 41/06* (2013.01); *A01D 41/127* (2013.01); *A01D 41/14* (2013.01); *A01D 41/141* (2013.01); *A01D 41/144* (2013.01); *A01D 69/00* (2013.01)

(58) Field of Classification Search
CPC .... A01D 45/021; A01D 41/14; A01D 41/141; A01D 41/144; A01D 41/127; A01D 69/00; A01D 34/04; A01D 34/283; A01D 41/06; A01D 34/44; A01B 73/06; A01B 73/044; A01B 73/02

See application file for complete search history.

(56) References Cited

U.S. PATENT DOCUMENTS

| 3,683,601 A | 8/1972 | Van der Lely |
| 4,126,189 A | 11/1978 | Channel |
| RE31,209 E | 4/1983 | Anderson |

(Continued)

FOREIGN PATENT DOCUMENTS

| DE | 3906456 A1 | 9/1990 |
| DE | 19725530 A1 | 12/1998 |

(Continued)

OTHER PUBLICATIONS

European Search Report for European Patent Application No. 18186329.1 dated Jan. 11, 2019 (5 pages).

(Continued)

*Primary Examiner* — Arpad Fabian-Kovacs
(74) *Attorney, Agent, or Firm* — Peter Zacharias; Patrick Sheldrake

(57) ABSTRACT

An agricultural header includes: a main section including a main frame carrying at least one cutting element; at least one wing section pivotably coupled to the main section and including a wing frame; and a linkage pivotably coupling the at least one wing section to the main section, the linkage including an upper bar and a lower bar which are both coupled to the main frame and the wing frame, the upper bar defining an upper bar axis and the lower bar defining a lower bar axis which is non-parallel to the upper bar axis.

20 Claims, 4 Drawing Sheets

(51) Int. Cl.
  *A01D 41/14* (2006.01)
  *A01D 69/00* (2006.01)

(56) References Cited

U.S. PATENT DOCUMENTS

| | | | |
|---|---|---|---|
| 4,409,780 | A | 10/1983 | Beougher et al. |
| 4,487,004 | A | 12/1984 | Kejr |
| 4,564,025 | A | 1/1986 | Dammann |
| 4,588,128 | A | 5/1986 | Broyhill et al. |
| 4,660,651 | A | 4/1987 | Pfenninger et al. |
| 4,903,470 | A | 2/1990 | Hemker et al. |
| 5,577,563 | A | 11/1996 | Holen |
| 5,673,543 | A | 10/1997 | Richardson et al. |
| 5,724,798 | A | 3/1998 | Stefl et al. |
| 5,911,625 | A | 6/1999 | von Allwörden |
| 6,675,568 | B2 | 1/2004 | Patterson et al. |
| 7,360,351 | B2 | 4/2008 | Rickert et al. |
| 7,614,206 | B2 | 11/2009 | Tippery et al. |
| 7,918,076 | B2 | 4/2011 | Talbot |
| 7,971,417 | B2 | 7/2011 | Link |
| 8,635,842 | B2 | 1/2014 | Markt |
| 9,173,345 | B2 | 11/2015 | Cressoni |
| 9,198,353 | B2 * | 12/2015 | Ritter .................. A01D 45/021 |
| 9,526,206 | B2 | 12/2016 | Schulze Ruckamp et al. |
| 9,775,291 | B2 | 10/2017 | Neudorf |
| 9,955,624 | B2 | 5/2018 | Sammut |
| 9,992,924 | B2 | 6/2018 | van Vooren et al. |
| 10,070,575 | B2 | 9/2018 | Wenger et al. |
| 10,405,474 | B2 * | 9/2019 | Brimeyer ............... A01D 41/16 |
| 10,433,486 | B2 * | 10/2019 | Vandeven .............. A01D 57/20 |
| 10,517,215 | B2 * | 12/2019 | Brimeyer ............... A01D 41/16 |
| 10,542,669 | B2 * | 1/2020 | Vandeven ............. A01D 34/283 |
| 10,568,266 | B2 * | 2/2020 | Vandeven ............ A01D 41/141 |
| 2003/0182912 | A1 | 10/2003 | Boll |
| 2004/0123575 | A1 * | 7/2004 | Rickert ................ A01D 41/144 |
| | | | 56/14.7 |
| 2006/0254240 | A1 | 11/2006 | Krone |
| 2006/0254242 | A1 | 11/2006 | Halter et al. |
| 2008/0072560 | A1 * | 3/2008 | Talbot ................... A01D 41/14 |
| | | | 56/208 |
| 2016/0262301 | A1 | 9/2016 | Van Vooren et al. |
| 2018/0035598 | A1 | 2/2018 | Wenger et al. |
| 2018/0310472 | A1 | 11/2018 | Vandeven et al. |
| 2019/0110402 | A1 * | 4/2019 | Vandeven .............. A01D 41/14 |
| 2019/0380269 | A1 * | 12/2019 | Brimeyer ................. A01D 1/00 |
| 2020/0053963 | A1 * | 2/2020 | Vandeven .............. A01D 41/14 |
| 2020/0128741 | A1 * | 4/2020 | Brimeyer ................ F15B 15/06 |
| 2020/0337240 | A1 * | 10/2020 | Brimeyer .................. F15B 1/26 |
| 2020/0344951 | A1 * | 11/2020 | Vandeven ............ A01D 41/141 |
| 2020/0352101 | A1 * | 11/2020 | Pierson ................ A01D 41/145 |
| 2021/0100155 | A1 * | 4/2021 | Vandeven ............ A01B 63/008 |

FOREIGN PATENT DOCUMENTS

| | | | | |
|---|---|---|---|---|
| DE | 102013001651 | A1 * | 7/2014 | .......... A01D 41/144 |
| EP | 0789990 | A1 | 1/1997 | |
| EP | 1166616 | A1 | 5/2001 | |
| EP | 1169906 | A1 | 7/2001 | |
| EP | 1169906 | A1 | 1/2002 | |
| EP | 2067397 | A1 | 4/2007 | |
| EP | 3066910 | A1 | 9/2016 | |
| EP | 3278653 | A1 | 2/2018 | |
| EP | 3395155 | A1 | 10/2018 | |
| EP | 3469876 | A1 | 4/2019 | |
| EP | 3473076 | A1 | 4/2019 | |
| FR | 3001359 | A1 | 1/2014 | |
| GB | 1135046 | A | 11/1968 | |
| GB | 1527000 | A | 10/1978 | |

OTHER PUBLICATIONS

Opposition filed by John Deere GmbH & Co. KG and Deere & Company on Dec. 7, 2020 opposing CNH Industrial Belgium nv patent EP3446558B1 (12 pages).

Reply to John Deere et al. opposition of EP3446558B1 filed by CNH Industrial Belgium nv on Apr. 15, 2021 (18 pages).

* cited by examiner

AGRICULTURAL HEADER WITH ONE OR MORE MOVABLE WING SECTIONS

CROSS REFERENCE TO RELATED APPLICATIONS

This is a continuation of U.S. patent application Ser. No. 15/681,732, entitled "AGRICULTURAL HEADER WITH ONE OR MORE MOVABLE WING SECTIONS", filed Aug. 21, 2017, which is incorporated herein by reference.

FIELD OF THE INVENTION

The present invention pertains to an agricultural vehicle and, more specifically, to an agricultural vehicle with a header having one or more movable wing sections.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

To remove crop material from the field, the header of the combine harvester may be equipped with a cutter bar assembly having many sharp cutting elements that reciprocate sidewardly, relative to a forward direction of travel, to sever the crop material from the field before entering the feeder housing. The header may include a rotating reel with tines or the like to sweep crop material toward the cutting elements.

To closely follow the ground and produce a consistent cut stalk length, many agricultural harvesters have flexible cutting elements, such as cutter bars, which can flex during harvesting. Flexure of the cutter bar(s) can help compensate for terrain irregularity encountered by the header during travel across a field. Some flexible cutter bars may allow, for example, 3 inches of travel in either direction from a normal, unflexed position, allowing the flexible cutter bar to compensate for up to 6 inches of ground irregularity across a width of the header.

Recent trends in agricultural vehicles have resulted in agricultural harvesters with relatively wider headers to allow more crop material to be cut in each pass of the harvester, reducing the number of passes necessary to harvest the crop material on a field. For example, some headers may have a width of 45 feet or more. Increasing the width of the header has been done in a variety of ways, including having a main section of the header which couples to one or more wing sections.

While widening the header allows for fewer passes to completely harvest a field, several challenges are presented by the increased widening of the header. As previously described, some flexible cutter bars can compensate for up to 6 inches of ground irregularity across a width of the header. As the header becomes wider, it has been found that more ground irregularity compensation may be needed to allow the header to consistently follow the ground due to many fields having more than 6 inches of ground deviation across a width of 45 feet or more.

What is needed in the art is an agricultural header which can follow the ground at increasing widths of the header.

SUMMARY OF THE INVENTION

In one exemplary embodiment formed in accordance with the present invention, there is provided a header having at least one wing or segment section pivotably coupled to a main section by a linkage with an upper bar and a lower bar.

In another exemplary embodiment formed in accordance with the present invention, there is provided an agricultural header including: a main section including a main frame carrying at least one cutting element; at least one wing section pivotably coupled to the main section and including a wing frame; and a linkage pivotably coupling the at least one wing section to the main section, the linkage including an upper bar and a lower bar which are both coupled to the main frame and the wing frame, the upper bar defining an upper bar axis and the lower bar defining a lower bar axis which is non-parallel to the upper bar axis.

In yet another exemplary embodiment formed in accordance with the present invention, there is provided an agricultural header including: a main section including a main frame carrying at least one cutting element; at least one segment section pivotably coupled to the main section and including a segment frame; and a linkage pivotably coupling the at least one segment section to the main section, the linkage including an upper bar and a lower bar which are both coupled to the main frame and the segment frame.

One possible advantage of exemplary embodiments formed in accordance with the present invention is the pivoting behavior of the at least one wing section relative to the main section can be varied by altering the configuration and orientation of the upper bar and lower bar of the linkage.

Another possible advantage of exemplary embodiments formed in accordance with the present invention is the orientation of the at least one segment section can be controlled by an actuator linked to the bars or segment section to alter the ground following behavior of the header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
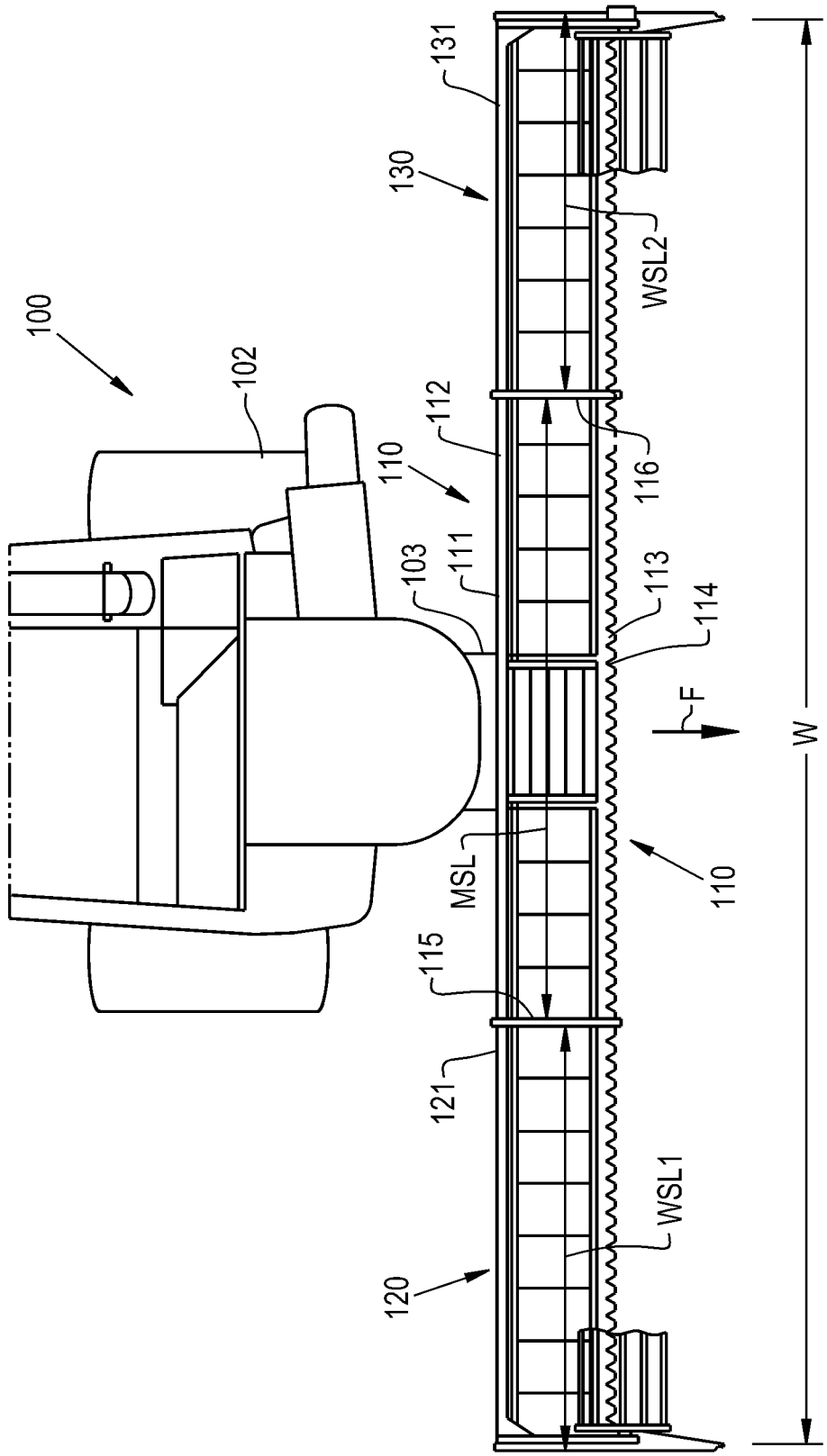
FIG. 1 illustrates a top view of an exemplary embodiment of an agricultural harvester, the agricultural harvester comprising a header having a main section and a pair of wing sections, in accordance with an exemplary embodiment of the present invention.

Referring now to the drawings, and more particularly to FIG. 1, there is shown an exemplary embodiment of an agricultural vehicle 100 in the form of a combine harvester which generally includes a chassis 102 and an agricultural header 110 carried by the chassis 102, in accordance with an exemplary embodiment of the present invention. Typically, the combine harvester 100 will include additional systems for the separation and handling of collected crop material, but these additional systems are omitted from view for brevity of description. It should be appreciated that the header 110 described and illustrated herein does not necessarily need to be included on a combine harvester, but can be incorporated in other agricultural vehicles such as mowers.

The header 110 includes a main section 111 with a main frame 112 carrying one or more cutting elements 113 with sharpened edges 114 to cut crop material as the vehicle 100 travels in a forward direction, denoted by arrow F. As shown, the cutting element 113 is a cutter bar, but other types of cutting elements can also be included in place of the cutter bar 113. Further, while the header 110 is shown in the exemplary embodiment of a grain header for harvesting grain, in some exemplary embodiments formed according to the present the header can be in the form of a corn header equipped with one or more appropriate cutting elements for harvesting corn. As shown in FIG. 1, the main frame 112 can be rigidly connected to the chassis 102 at a mount 103, but this is an optional configuration. The main section 111 can have a pair of opposed lateral ends 115 and 116, with a wing section 120 and 130 pivotably coupled to each of the lateral ends 115, 116, respectively. As used herein, "pivotably coupled" signifies that each wing section 120, 130 can be connected to its respective lateral end 120, 130 so the wing sections 120, 130 can pivot during travel of the vehicle 100, which is described further herein. The wing sections 120, 130 each have a respective wing frame 121, 131 which may also support the cutter bar 113, as shown, so pivotable movement of the wing sections 120, 130 may cause flexing of the cutter bar 113 to follow the ground, as will be described further herein. As shown, the main section 111 can define a main section length MSL which may be greater than a respective wing section length WSL1, WSL2 of the wing sections 120, 130; in some exemplary embodiments, one or more of the wing section lengths WSL1, WSL2 may be greater than the main section length MSL. Further, while two wing sections 120, 130 are shown and described herein, it should be appreciated that the vehicle 100 may only include one wing section or more than two wing sections, if desired.

Figure 2:
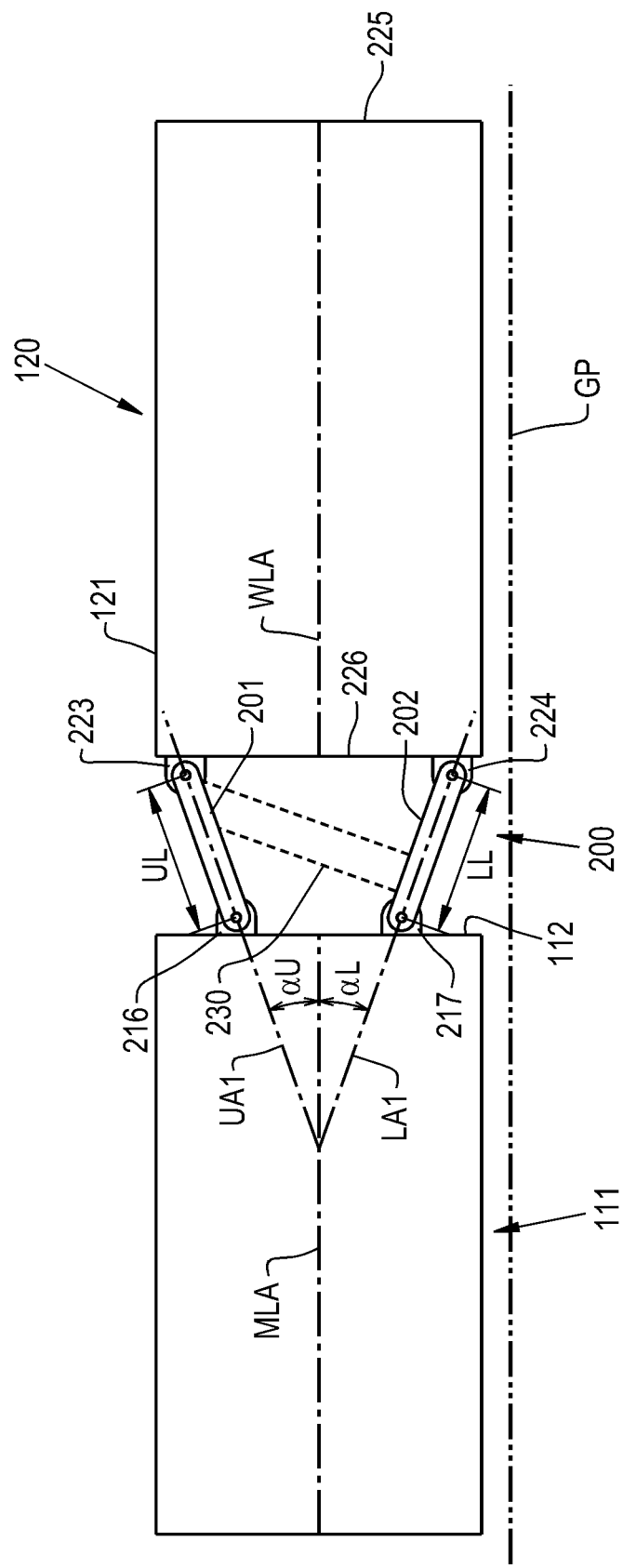
FIG. 2 illustrates a rear view of the header of the agricultural vehicle of FIG. 1 in a first orientation, in accordance with an exemplary embodiment of the present invention.

Referring now to FIG. 2, an exemplary embodiment of a linkage 200 pivotably coupling one of the wing sections 120, 130 to the main section 111 is shown. While not shown in FIG. 2, another linkage similar to the linkage 200 shown in FIGS. 2-3, or other linkage, can be used to pivotably couple the wing section 130 to the main section 110. The linkage 200 includes an upper bar 201 and a lower bar 202 which are both coupled to the wing frame 121 and the main frame 112. As shown, the upper bar 201 can be coupled to an upper main pivot 216 of the main section 111 and an upper wing pivot 223 of the wing section 120 and the lower bar 202 can be coupled to a lower main pivot 217 of the main section 111 and a lower wing pivot 224 of the wing section 120, as shown. The upper bar 201 and lower bar 202 can both be formed as substantially rigid, i.e., generally inflexible, bars, with the upper bar 201 defining an upper bar length UL and the lower bar 202 defining a lower bar length LL which is the same as the upper bar length UL. As the linkage 200 includes the upper bar 201 and lower bar 202 connected to the main frame 112 and wing frame 121, the frames 112, 121 and bars 201, 202 together can act as a four-bar linkage between the wing section 120 and the main section 111, as opposed to a more traditional hinge linkage incorporated in many headers.

Figure 3:
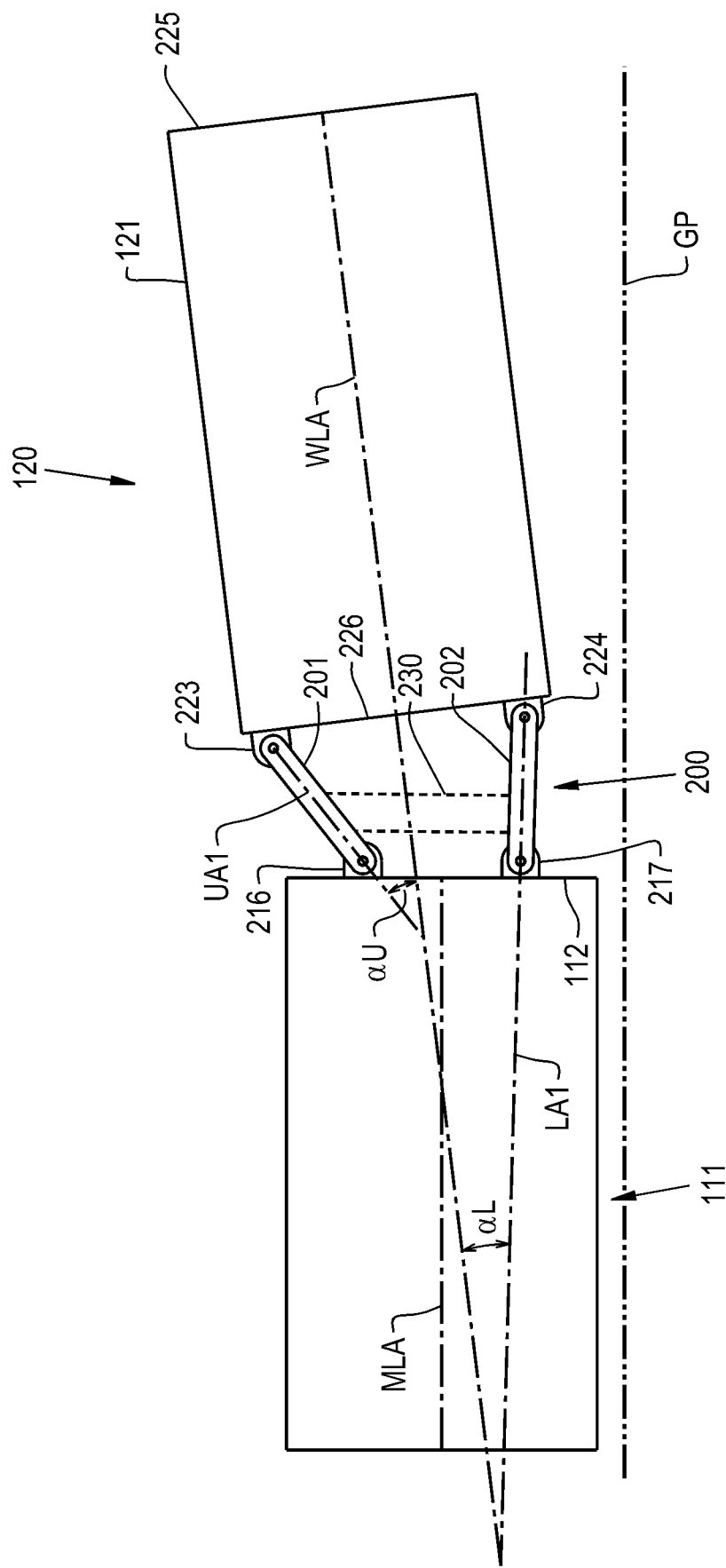
FIG. 3 illustrates a rear view of the header shown in FIGS. 1-2 in a second orientation, in accordance with an exemplary embodiment of the present invention.

To magnify the flexure of the cutter bar 113 in sections of the cutter bar 113 further from the main section 111, and now also referring to FIG. 3, the upper bar 201 defines an upper bar axis UA1 and the lower bar 202 defines a lower bar axis LA1 which is non-parallel to the upper bar axis UA1. As can be seen by comparing FIGS. 2 and 3, having the upper bar axis UA1 and lower bar axis LA1 non-parallel to each other as shown allows pivoting of the wing section 120 relative to the main section 111 to cause a lateral outer end 225 of the wing section 120 to raise more than a lateral inner end 226 of the wing section 120 with the upper wing pivot 223 and lower wing pivot 224. Since the deviations in the ground can be more pronounced adjacent the lateral outer end 225 of the wing section 120 compared to the lateral inner end 226 of the wing section 120, having the lateral outer end 225 raise more than the lateral inner end 226 during pivoting of the wing section 120 can allow an increased effective flexure of the cutter bar 113 and allow the cutter bar 113 to more closely follow the ground across an entire width W of the header 110 (shown in FIG. 1), especially when the width W of the header 110 is relatively large.

When the wing section 120 is relatively level with the main section 111, as shown in FIG. 2, the wing section 120 can define a wing longitudinal axis WLA which is coaxial with a main longitudinal axis MLA of the main section 111 and parallel to a ground plane GP on which the vehicle 100 is resting. The upper bar axis UA1 of the upper bar 201 and the lower bar axis LA1 of the lower bar 202 can both also be non-parallel to the wing longitudinal axis WLA such that the bar axes UA1, LA1 of the respective bars 201, 202 are angled with respect to the wing longitudinal axis WLA. In this sense, the upper bar axis UA1 of the upper bar 201 can form an upper bar angle $\alpha U$ relative to the wing longitudinal axis WLA and the lower bar axis LA1 of the lower bar 202 can form a lower bar angle $\alpha L$ relative to the wing longitudinal axis WLA which may be different than or equal to the upper bar angle $\alpha U$. The upper bar angle $\alpha U$ can be varied by, for example, altering the upper bar length UL of the upper bar 201 and/or adjusting the positions of the upper main pivot 216 and upper wing pivot 223 relative to one another. Similarly, the lower bar angle $\alpha L$ can be varied by, for example, altering the lower bar length LL of the lower bar 202 and/or adjusting the positions of the lower main pivot 217 and lower wing pivot 224 relative to one another. By adjusting the upper bar angle $\alpha U$ and the lower bar angle $\alpha L$, the pivoting behavior of the wing section 120 relative to the main section 111 can be adjusted as desired. As should be appreciated from FIGS. 2 and 3, the four-bar linkage 200 can be configured so that the upper bar axis UA1 and lower bar axis LA1 are maintained in a non-parallel relationship relative to one another regardless of an orientation of the wing section 120 relative to the main section 111. In some exemplary embodiments, the four-bar linkage 200 can also be configured so the upper bar angle αU and the lower bar angle αL stay constant during pivoting of the wing section 120 relative to the main section 111. In one exemplary embodiment, the header 110 can include an actuator 230, illustrated in dashed lines, coupling the upper bar 201 to the lower bar 202 to maintain the non-parallel relationship and/or the upper bar angle αU and lower bar angle αL, but it should be appreciated that the actuator 230 is not needed to maintain the non-parallel relationship between the upper bar 201 and lower bar 202 or the corresponding bar angles αU and αL.

Figure 4:
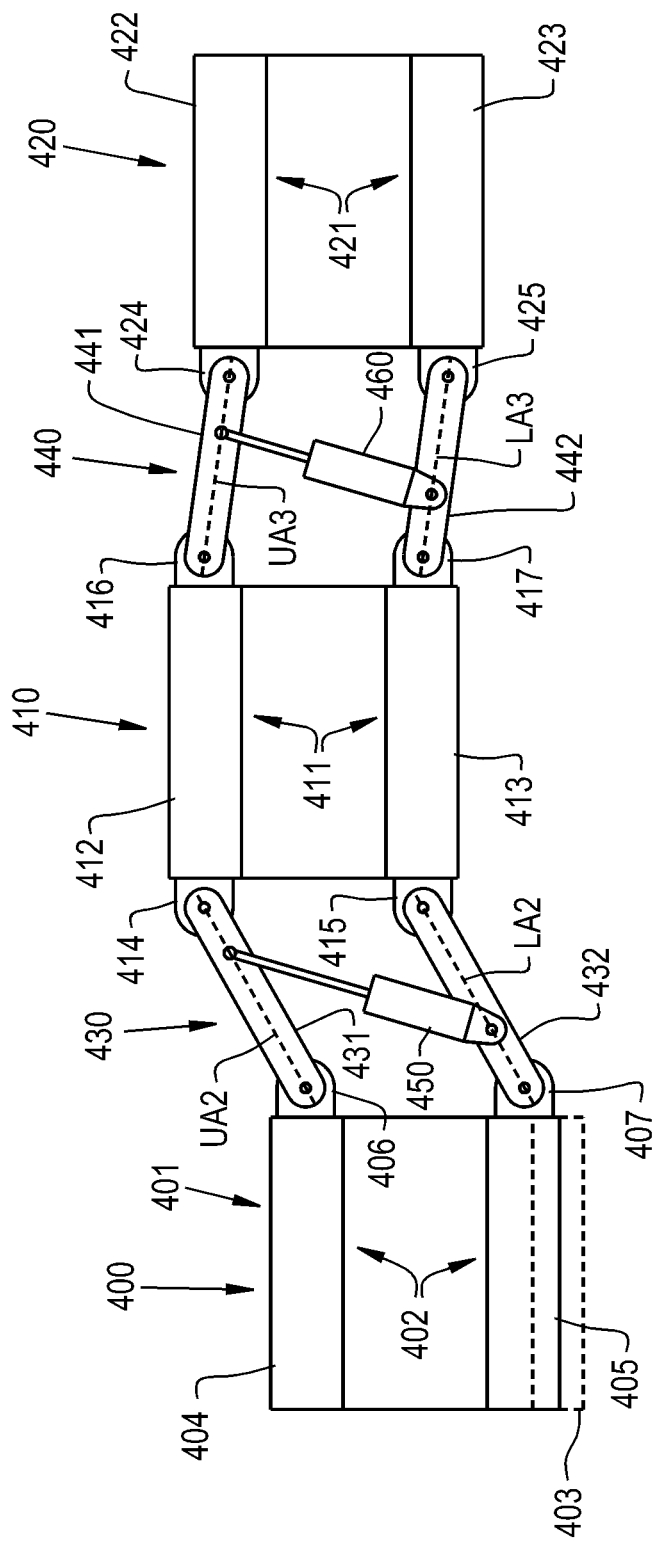
FIG. 4 illustrates a rear view of another exemplary embodiment of a header which can be incorporated in the agricultural harvester shown in FIG. 1, the header including a main section and a pair of segment sections.

In another exemplary embodiment of a header 400 formed in accordance with the present invention, and referring now to FIG. 4, the header 400 can include a main section 401 including a main frame 402 carrying one or more cutting elements 403, such as a cutter bar, a first segment section 410 pivotably coupled to the main section 401 and including a first segment frame 411, and can also include a second segment section 420 pivotably coupled to the first segment section 410 and including a second segment frame 421. As shown, the main frame 402 of the main section 401 can include an upper main bar 404 and a lower main bar 405, with the main bars 404, 405 of the main frame 402 being connected to, for example, the chassis 102 of the agricultural vehicle 100. Similarly, the first segment frame 411 can include a first segment upper bar 412 and a first segment lower bar 413 and the second segment frame 421 can include a second segment upper bar 422 and a second segment lower bar 423. In some exemplary embodiments, the first segment frame 411 and/or the second segment frame 421 are formed to be substantially rigid, i.e., resistant to easily bending, by forming the frames 411, 412 out of, for example, a relatively rigid metal such as steel.

A linkage 430 pivotably couples the first segment section 410 to the main section 401 and includes an upper bar 431 and a lower bar 432 which are both coupled to the main frame 402 and the first segment frame 411. As shown, the upper bar 431 can pivotably couple to the upper main bar 404 at an upper main pivot 406 and the first segment upper bar 412 at a first segment upper pivot 414 and the lower bar 432 can pivotably couple to the lower main bar 405 at a lower main pivot 407 and the first segment lower bar 413 at a first segment lower pivot 415. Similarly, a second linkage 440 can pivotably couple the first segment section 410 to the second segment section 430 and include a second upper bar 441 and a second lower bar 442. As shown, the second upper bar 441 can pivotably couple to the first segment upper bar 412 at another first segment upper pivot 416 and the second segment upper bar 422 at a second segment upper pivot 424 and the second lower bar 442 can pivotably couple to the first segment lower bar 413 at another first segment lower pivot 417 and the second lower bar 442 at a second segment lower pivot 425. It should be appreciated that additional segment sections can be added, if desired, and have similar constructions to the first and second segment sections 410, 420 described herein.

To control pivoting behavior of the first segment section 410 in one exemplary embodiment formed according to the present invention, an actuator 450 may be coupled to the upper bar 431, the lower bar 432, and/or the first segment section 410. In some exemplary embodiments formed according to the present invention, the actuator 450 can couple the upper bar 431 to the lower bar 432, as shown, or, alternatively, the actuator 450 may connect to other parts of the header 400 such as the main section 401 or the first segment section 411. In another exemplary embodiment formed according to the present invention, the actuator 450 can be part of a gauge wheel assembly (not shown) which supports the weight of the first segment section 410 and allows the first segment section 410 to follow the ground. The actuator 450 can be, for example, a selectively activated cylinder which can cause linear up and down movement of the upper main bar 403 and lower main bar 404 as well as the first segment upper bar 412 and first segment lower bar 413. Additionally, the actuator 450 can be selectively activated to control pivoting behavior of the first segment section 410 relative to the main section 401. Similarly, in some exemplary embodiments formed according to the present invention, a second actuator 460 can couple to the second upper bar 441, the second lower bar 442, and/or the second segment section 430; the second actuator 460 can couple the second upper bar 441 to the second lower bar 442, as shown, to other parts of the header 400, or be a part of a gauge wheel assembly (not shown), similar to the previously described actuator 450. By having the header 400 separated into the main section 401 with coupled segment sections 410 and 420, ground following of the cutter bar 403 can be improved due to the segment sections 410, 420 coupled to the main section 401 being independently pivotable, relative to the main section 401 and each other, and able to "float" on the ground as the vehicle 100 travels across a field. The actuators 450, 460, therefore, can act to help control the float behavior of the segment section(s) 410, 420 to assist the header 400 in following the ground by pushing or pulling on a respectively connected element and causing a corresponding change in the following behavior of the segment section(s) 410, 420.

As can be seen, the upper bar 431 of the first linkage 430 can define an upper bar axis UA2 and the lower bar 432 of the first linkage 430 can define a lower bar axis LA2 which is parallel to the upper bar axis UA2. Similarly, the second upper bar 441 of the second linkage 440 can define a second upper bar axis UA3 and the second lower bar 442 of the second linkage 440 can define a second lower bar axis LA3 which is parallel to the second upper bar axis UA3. In one exemplary embodiment, the upper bar axis UA2 and lower bar axis LA2 are non-parallel to the second upper bar axis UA3 and second lower bar axis LA3, which can be a result of the header 400 traveling across uneven terrain or an intentional relative angling.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:
1. An agricultural header, comprising:
a main section including a main frame carrying at least one cutting element and at least one first transverse draper belt extending to a first end of the main section;
at least one wing section pivotably coupled to the first end of the main section and including a wing frame and at least one second transverse draper belt extending toward the first end of the main section;

another wing section pivotably coupled to a second end of the main section that is opposite the first end; and a linkage pivotably coupling the at least one wing section to the main section, the linkage including an upper bar and a lower bar which are both coupled to the main frame and the wing frame, at least one of the upper bar or the lower bar coupling a pivot of the main section to a pivot of the at least one wing section, the upper bar defining an upper bar axis and the lower bar defining a lower bar axis which is non-parallel to the upper bar axis.

2. The agricultural header of claim 1, wherein the at least one wing section defines a wing longitudinal axis, at least one of the upper bar axis and the lower bar axis being non-parallel to the wing longitudinal axis.

3. The agricultural header of claim 2, wherein the upper bar axis and the lower bar axis are both non-parallel to the wing longitudinal axis.

4. The agricultural header of claim 1, wherein the main section includes an upper main pivot and a lower main pivot and the at least one wing section includes an upper wing pivot and a lower wing pivot, the upper bar being coupled to the upper main pivot and the upper wing pivot and the lower bar being coupled to the lower main pivot and the lower wing pivot.

5. The agricultural header of claim 4, wherein the upper bar defines an upper bar length and the lower bar defines a lower bar length which is equal to the upper bar length.

6. The agricultural header of claim 1, wherein the linkage is configured to maintain the upper bar axis and the lower bar axis in a non-parallel relationship regardless of an orientation of the at least one wing section relative to the main section.

7. The agricultural header of claim 1, further comprising an actuator coupling the upper bar to the lower bar.

8. The agricultural header of claim 1, wherein the main section, the at least one wing section, the upper bar, and the lower bar together act as a four-bar linkage.

9. The agricultural header of claim 8, wherein the at least one cutting element is a cutter bar.

10. The agricultural header of claim 9, wherein the cutter bar is a flexible cutter bar.

11. The agricultural header of claim 1, wherein the main section defines a main section length and the at least one wing section defines a wing section length that differs from the main section length.

12. The agricultural header of claim 1, wherein the at least one cutting element is a cutter bar.

13. The agricultural header of claim 1, wherein the wing frame supports the at least one cutting element.

14. The agricultural header of claim 1, further comprising a mount coupled to the main frame and configured to connect to a chassis of an agricultural vehicle.

15. An agricultural vehicle, comprising:
a chassis; and
a header carried by the chassis, the header comprising:
a main section including a main frame carrying at least one cutting element and at least one first transverse draper belt extending to a first end of the main section;
at least one wing section pivotably coupled to the first end of the main section and including a wing frame and at least one second transverse draper belt extending toward the first end of the main section;
another wing section pivotably coupled to a second end of the main section that is opposite the first end; and
a linkage pivotably coupling the at least one wing section to the main section, the linkage including an upper bar and a lower bar which are both coupled to the main frame and the wing frame, at least one of the upper bar or the lower bar coupling a pivot of the main section to a pivot of the at least one wing section, the upper bar defining an upper bar axis and the lower bar defining a lower bar axis which is non-parallel to the upper bar axis.

16. The agricultural vehicle of claim 15, wherein the main section, the at least one wing section, the upper bar, and the lower bar together act as a four-bar linkage.

17. The agricultural vehicle of claim 16, wherein the at least one cutting element is a cutter bar.

18. The agricultural vehicle of claim 17, wherein the cutter bar is a flexible cutter bar.

19. The agricultural vehicle of claim 15, wherein the main section defines a main section length and the at least one wing section defines a wing section length that differs from the main section length.

20. The agricultural vehicle of claim 15, wherein the wing frame supports the at least one cutting element.

* * * * *